United States Patent [19]

Rosauer et al.

[11] 4,150,289
[45] Apr. 17, 1979

[54] GAMMA RAY CALIBRATION SYSTEM

[75] Inventors: Peter J. Rosauer, Mt. Prospect; John J. Flaherty, Elk Grove, both of Ill.

[73] Assignee: Magnaflux Corporation, Chicago, Ill.

[21] Appl. No.: 800,746

[22] Filed: May 26, 1977

[51] Int. Cl.² .................. G01D 18/00; G01N 23/00
[52] U.S. Cl. ............................ 250/252; 250/358 R
[58] Field of Search ............... 250/252, 358 P, 358 R, 250/359, 360

[56] References Cited

U.S. PATENT DOCUMENTS 3,683,187  8/1972  Tompkins ........................ 250/252

Primary Examiner—Alfred E. Smith
Assistant Examiner—Janice A. Howell
Attorney, Agent, or Firm—Hill, Gross, Simpson, Van Santen, Steadman, Chiara & Simpson

[57] ABSTRACT

A method and apparatus for calibrating a gamma ray inspection system for measuring the wall thickness of a tubular product such as a pipe or the like, the system including a gamma ray beam generating station, means for conveying a tubular product axially past the gamma ray beam, the gamma ray generator being rotated during the axial movement of the tubular product, means for detecting the amount of attenuation of the gamma rays passing through the tubular product, and a calibration block having a first portion with a thickness corresponding to twice the nominal wall thickness of the tubular product to be inspected, and a second portion having a thickness corresponding to a predetermined amount less than the nominal wall thickness. Means are provided for selectively introducing the first portion and the second portion of the calibration block into the gamma ray beam to enable the operator to calibrate the equipment and to be able to detect tubular products which are defective in terms of thickness.

9 Claims, 9 Drawing Figures

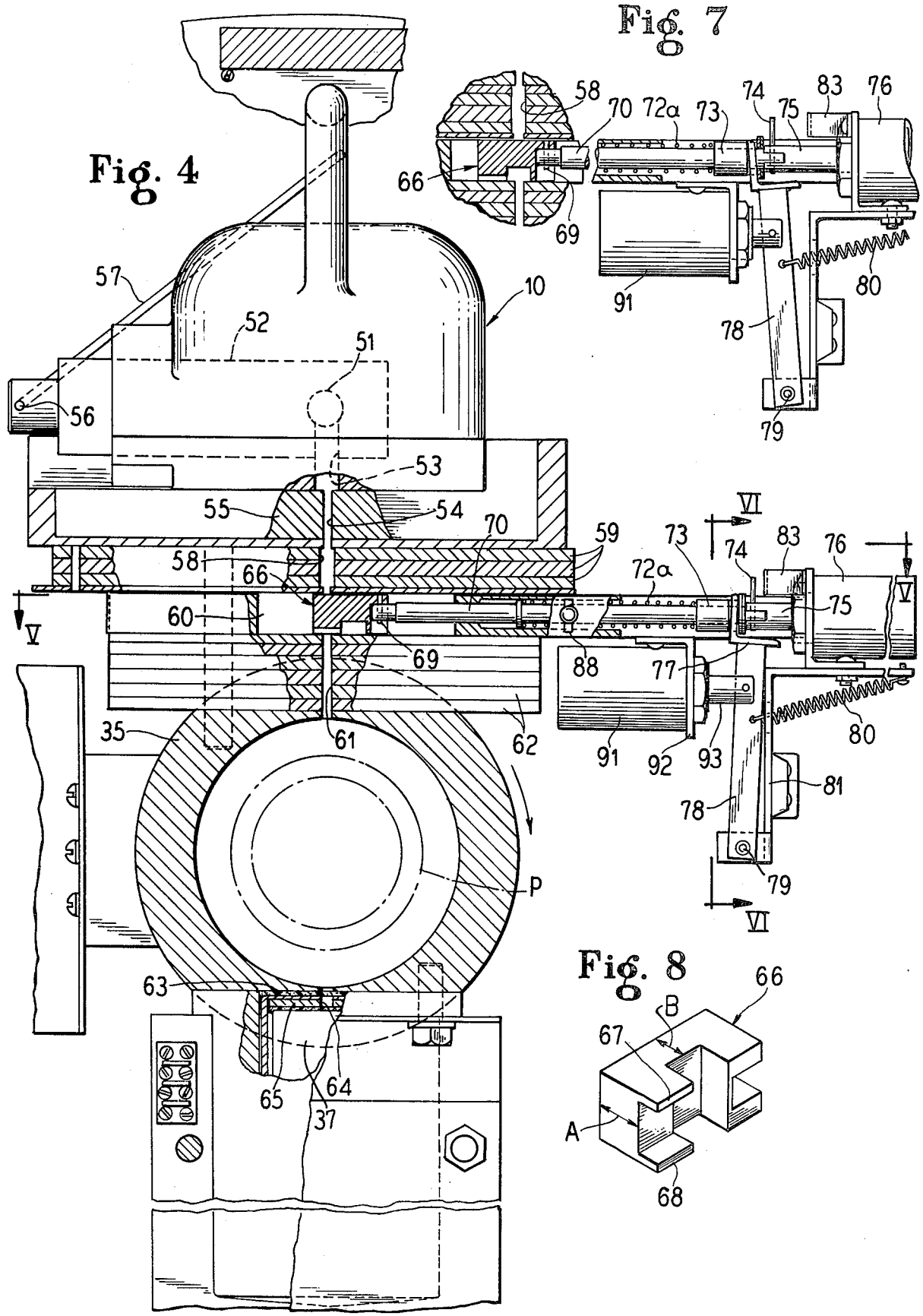

GAMMA RAY CALIBRATION SYSTEM

BACKGROUND OF THE INVENTION

1. Field of the Invention

This invention is in the field of gamma ray inspection devices for tubular products and the like employing an improved calibrating block which prevents the sensing system from being overloaded when no tubular product is present, and also provides the operator with a means for visually detecting the presence of wall thicknesses which are less than a required minimum.

2. Description of the Prior Art

It is common practice to check reconditioned pipe used in oil wells to make sure that the wall thickness of the pipe is still above a predetermined minimum. The wall thickness can be reduced, for example, by rubbing, by the rods used in the oil well, or in some cases by corrosion. Inspection of such pipes is necessary if catastrophic failure is to be avoided.

Testing services are now being provided whereby gamma ray scanning equipment is sent to the site and the scanning is performed on the job. A conveyor system is set up which delivers individual lengths of tubing or pipe into a scanning head which may be supported, for example, on the back of a truck. The conveyor moves the tubular product axially through the scanning head, and the head is rotated at a velocity of about 120 rpm so that a helical scan is produced. The amount of gamma ray attenuation in passing through the pipe or the tubular product is detected by a suitable detector device such as a scintillation counter, and the electrical impulses from the counter are passed to a recording device such as a pen-type recorder and/or a thickness indicator gauge so that the operator can continuously monitor the tubular products being tested.

Since the feed of pipes to be inspected is intermittent, there is usually a significant gap between pipes being tested. As a result, after one pipe has been passed through the rotating head, the gamma ray beam strikes the scintillation crystal detector and overloads the electronic sensing system. When this happens, it takes several minutes for the sensing system to be restored to operative condition.

The problem of proper calibration is also important if the sensing system is to give reliable results. The American Petroleum Institute sets up standards which classify pipe by the reduction of wall thickness. For example, if the wall thickness is reduced by a factor of in excess of 12½% of the original nominal wall thickness, the pipe must be reclassified with a lower classification. It therefore becomes important for the operator to be able to sense when this amount of wall thickness reduction has occurred.

In the past, it has been common practice to attempt calibration by laying a hacksaw blade on the pipe and passing it through the rotating head. Since the thickness of the hacksaw blade is known, some measure of calibration can be achieved by using appropriate multipliers to determine a spot on the recording chart which would indicate the nominal wall thickness for the particular pipe being tested. However, this method is not particularly satisfactory since it requires additional computation which computation must be repeated every time a different diameter pipe is sent through the scanning device.

SUMMARY OF THE INVENTION

The present invention provides a method and apparatus for overcoming the defects of prior practice. It involves the use of a calibrating block in the gamma ray beam, the block in one portion representing attenuation equivalent to twice the nominal wall thickness of the pipe to be tested. Consequently, when the gamma ray beam passes through this first portion of the block, the visual indicators can be calibrated immediately to provide a reference point against which subsequent readings can be compared. Another portion of the calibrating block is provided with a step which has gamma ray attenuation characteristics equivalent to that of a borderline condition, for example, a wall thickness reduction of 12½%. By passing the gamma ray beam through this second portion, an operator can immediately determine a reference position from which he is able to determine whether a given length of pipe is acceptable or not acceptable.

The method of the present invention therefore involves passing a beam of gamma rays radially through an axially moving tube being tested, measuring the amount of gamma ray radiation passing through the tube, interposing a calibrating block into the beam when no tube is moving thereby, the calibrating block having one portion of a thickness of substantially twice the nominal wall thickness of the tube being tested and periodically presenting another portion of the calibrating block to the gamma ray beam, the other portion having a thickness which is a predetermined amount less than the nominal wall thickness.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure and in which:

FIG. 4 is a view taken substantially along the line IV—IV of FIG. 2;

FIG. 7 is a fragmentary view of the showing of FIG. 4, but illustrating the position of the elements in which the second portion of the calibrating block is in position;

FIG. 8 is a view in perspective of a typical calibrating block used according to the present invention.

DESCRIPTION OF THE PREFERRED EMBODIMENTS

Figure 1:
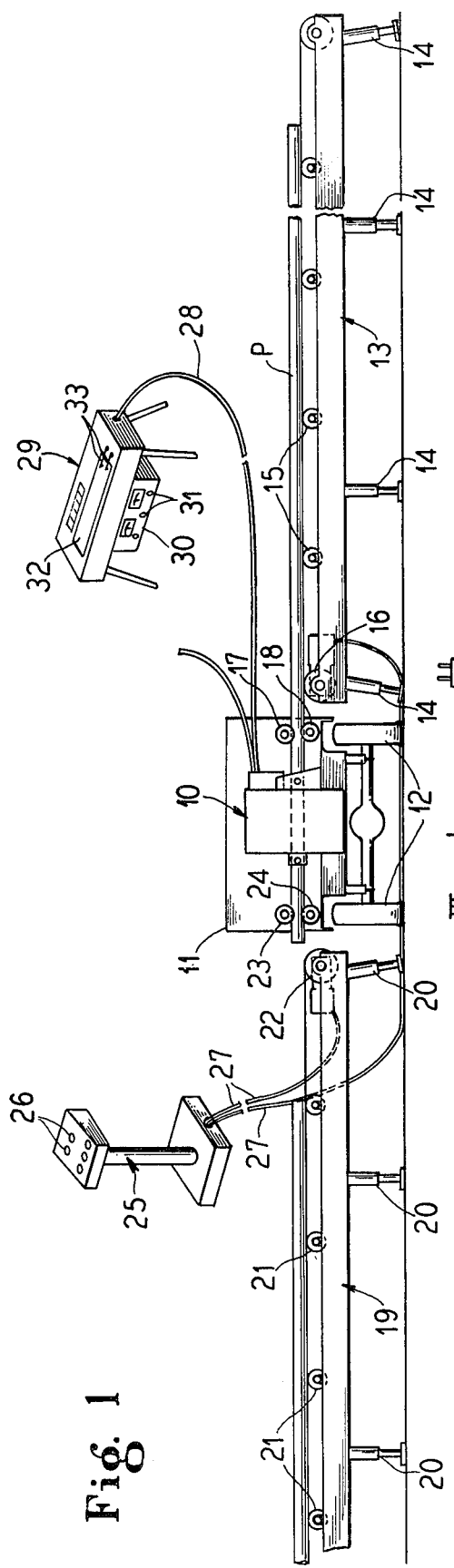
FIG. 1 is a fragmentary view of a portable pipe testing installation of the type with which the present invention is concerned.

In FIG. 1, there is illustrated generally a testing system for testing pipe on location in an oil field. The testing system includes a scanning head 10 mounted on a truck 11 provided with wheels 12. An input conveyor 13 is positioned on legs 14 whose height is adjustable to compensate for different diameter pipes being tested. The conveyor system includes rollers 15 and a conveyor drive 16 which delivers the pipe to be tested between a pair of pinch rollers 17 and 18 at the input end of the scanning head 10.

On the outlet side of the system, there is provided an outlet conveyor 19 having adjustable length legs 20 supporting a conveyor system including rollers 21 and a conveyor drive 22. Pinch rollers 23 and 24 deliver the length of pipe after inspection by the scan unit 10 to the outlet conveyor 19.

A console 25 provides a control unit including push buttons 26 and cables 27 connected to the conveyor drives 16 and 22, respectively to permit the operator to start and stop either conveyor as desired. Signals from the sensing device are transmitted via a cable 28 to a console 29 which houses a power supply and a signal processing chamber 30 having push buttons 31 thereon and a recorder unit such as a strip recorder 32 which is inscribed by a plurality of pens 33. Normally, the console 25 and the console 29 will be adjacent to each other so that they can be conveniently operated by the same operator.

Figure 3:
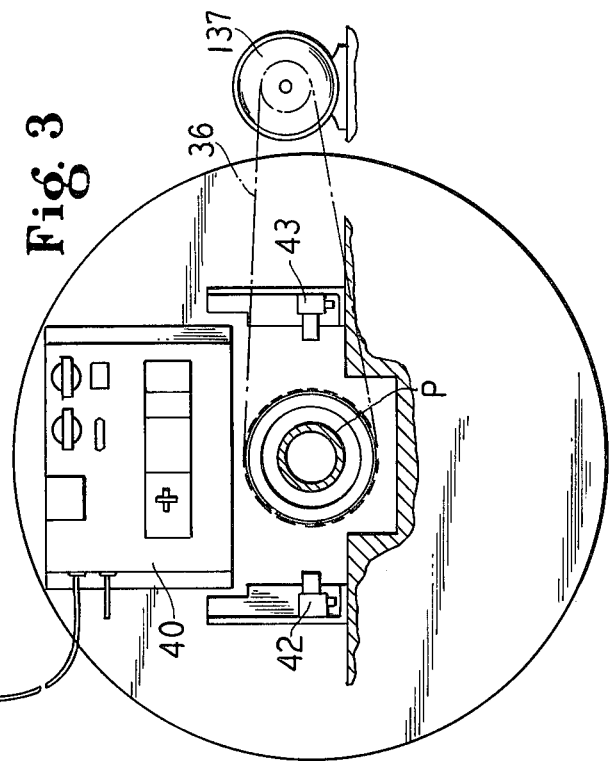
FIG. 3 is a view taken substantially along the line III—III of FIG. 2.
Figure 2:
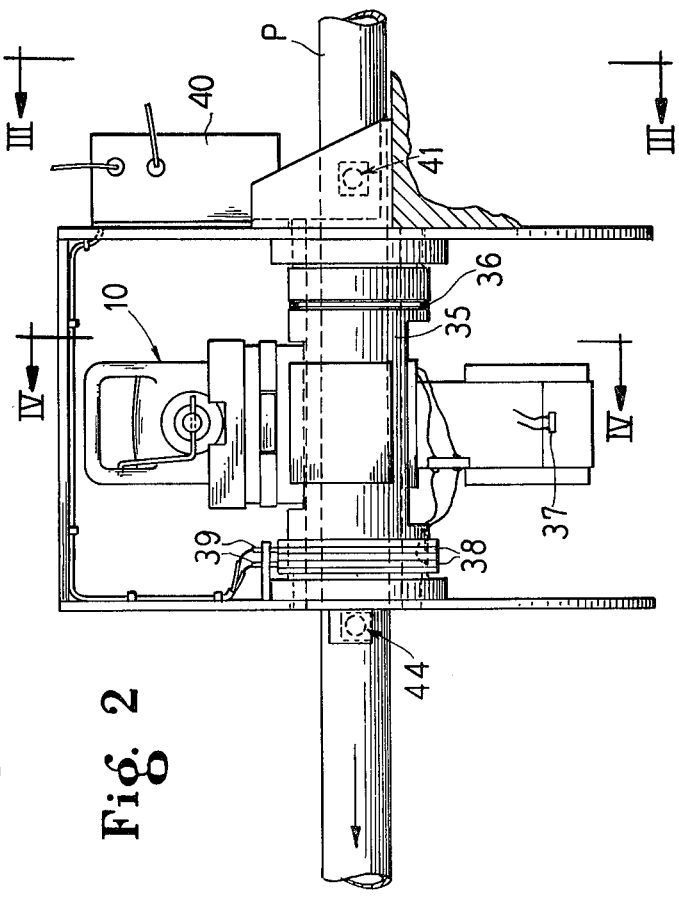
FIG. 2 is a view of the scanning head, partly broken away to illustrate the interior.

The scanning unit itself is best shown in FIGS. 2 and 3 of the drawings. In general, the unit is symmetrical about its axis of rotation, thereby facilitating rotation. The scanning unit 10 is mounted on a spindle 35 which is driven by means of a belt 36 from a motor 37. The upper portion of the scanning head 10 carries the gamma ray source, while the lower portion carries a gamma ray sensor 37 such as a scintillation counter or the like. The electrical signals generated by the sensor 37 are delivered to a pair of collector rings 38 where they are picked off by a pair of brushes 39 and sent to a signal outlet box 40 from whence they are delivered by means of the cable 28 to the console 29.

In order to insure that the pipe P being tested is in proper position, we provide a series of electric eye assemblies before and after the gamma ray generating station. The inlet electric eye assembly 41 includes a light source 42 and a sensor 43 as shown in FIG. 3. A second electric eye assembly 44 is positioned beyond the scanning head 10 as shown in FIG. 2. Only when both of the electric eye assemblies 41 and 44 sense the presence of the pipe is the system operative to withdraw the calibrating block as will be explained in the succeeding portion of this specification. This is a fail-safe feature which prevents the gamma ray beam from accidentally being turned on when no pipe is present.

Referring to FIG. 4, there is shown a relatively detailed view of the rotating scanner mechanism. A radioactive isotope in the form of a capsule 51 is positioned in a holder 52 and is arranged to direct gamma ray radiation through a passage 53 into a bore 54 provided in an attenuating plate 55. The passage 53 and the bore 54 are in registry in normal operation of the device. When, for some reason, it is desired to terminate the gamma ray radiation through the device, a pin 56 is removed from a strut 57, permitting the upper part of the scanning device including the emitter capsule 51 to be rotated relative to the rest of the scanner and positioning the passage 53 against the solid portion of the attenuator plate 55.

The bore 54 in normal operation communicates with a bore 58 formed in a plurality of attenuator plates 59. Beneath the plates 59 there is a chamber 60 in which the improved calibration device of the present invention is arranged to reciprocate. During the testing operation, when the calibration device is removed, the gamma ray beam goes through registering apertures 61 in a plurality of plates 62 overlying the pipe P to be tested.

Upon passing through the pipe P, the gamma rays pass through a thin disk 63 of medium density open celled foam and then through an aperture 64 provided in a lead plate 65, whereupon they strike the scintillation counter 37.

Figure 5:
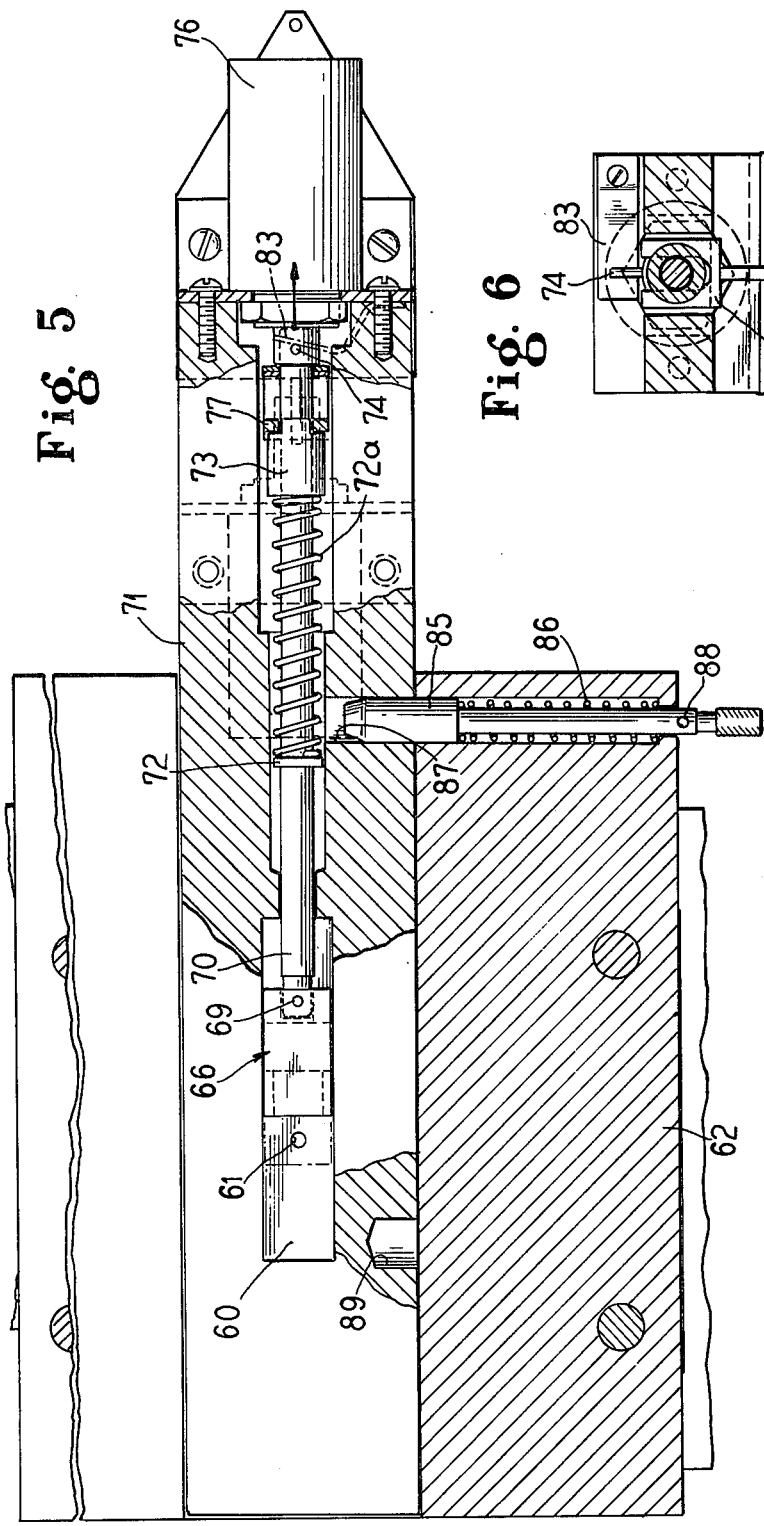
FIG. 5 is a view taken substantially along the line V—V of FIG. 4.
Figure 6:
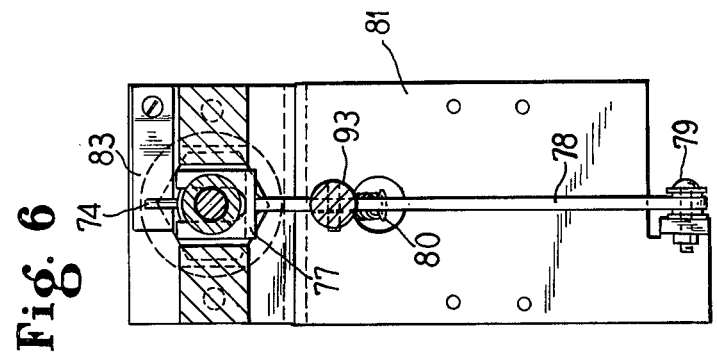
FIG. 6 is a view taken substantially along the line VI—VI of FIG. 4.

A typical calibration block 66 according to the present invention is shown in perspective in FIG. 8 of the drawings. It includes a first portion having a dimension A which is twice the nominal wall thickness of the pipe being tested. The portion A is supported on legs 67 and 68 to facilitate sliding the calibration block in the chamber 60. A second portion of the block has a dimension indicated at B which is a predetermined amount, for example 12½% less than the nominal wall thickness. This dimension, therefore, represents the minimum acceptable dimension for this particular type of pipe. The calibration block 66 is provided with an aperture through which a pin 69 (FIG. 7) extends. The pin 69 connects the calibration block 66 to an actuator rod 70. As best seen in FIG. 5, the actuator rod 70 is received in a carrier 71 which is slidable relative to the plates 62. The actuator rod 70 is formed with a collar 72 and at its opposite end is provided with a bifurcated slide 73. The pin 74 connects the extreme end of the actuating rod 70 to an armature 75 of a first solenoid 76.

The slide 73 is keyed to an L-shaped bracket 77 which is supported on an arm 78 mounted for pivotal rotation about a pin 79. A spring 80 connects the arm 78 to a bracket 81 on which the solenoid 76 is mounted. The spring 80 thus biases the arm into abutment with the corner of the bracket 81 as illustrated in FIG. 4 and in this position, the portion A of the calibrating block 66 is in the path of the gamma rays as illustrated in that figure.

When the calibrating block 66 is to be withdrawn so that a reading can be taken on the pipe itself, solenoid 76 is energized, thereby retracting the calibration block 66 and causing the pin 74 to engage a leaf spring 83 which serves as a resilient stop. When solenoid 76 is deenergized, the calibration block 66 returns to the position indicated in FIG. 4 of the drawings.

Each different type of pipe will have its own suitably dimensioned calibration block 66. To facilitate interchange of the blocks, the entire carrier assembly 71 is made slidable as best seen in FIG. 5. In normal operation, the carrier 71 is positioned by means of a detent mechanism consisting of a plunger 85 urged by a spring 86 into a recess 87 provided in the carrier 71. A pin 88 passing through the plunger 85 limits the amount of movement of the plunger. When the plunger is pulled out against the action of the spring 86, the entire carrier assembly 71 can be moved to the right as seen in FIG. 5 and the plunger reengaged with a recess 89. In this position, the calibration block 60 is readily accessible and can be changed without dismantling the entire unit.

A second solenoid 91 is mounted on a bracket 92 and has a solenoid shaft 93 pivotally connected to the arm 78. Upon actuation of the solenoid 91, as illustrated in FIG. 7 of the drawings, the arm 78 is pivoted against the action of the spring 80, withdrawing armature 75 beyond the range where it can be pulled back by the solenoid 76. This moves the calibration block 66 to the left as shown in FIG. 7, putting the smaller thickness portion B of the block in the path of the gamma ray beam.

The operation of the device will now be explained in detail. When there is no pipe passing through the scanning unit, the calibration block 66 is in position as shown in FIG. 4 of the drawings, and the trace on the strip recorder will be a substantially horizontal line as indicated at reference numeral 100 in FIG. 9. This level indicates to the operator what the reading should be if the pipe still had its original nominal wall thickness. To further calibrate the device, the operator energizes the solenoid 91 by means of one of the push buttons 31, placing the calibration block in the position shown in FIG. 7 of the drawings where the dimension "B" is in the path of the gamma ray excitation. The operator then has an indication on his chart as to the difference between the levels 101 when the dimension "B" is in the gamma ray path and the level 100 when the dimension "A" is in the gamma ray path.

Figure 9:
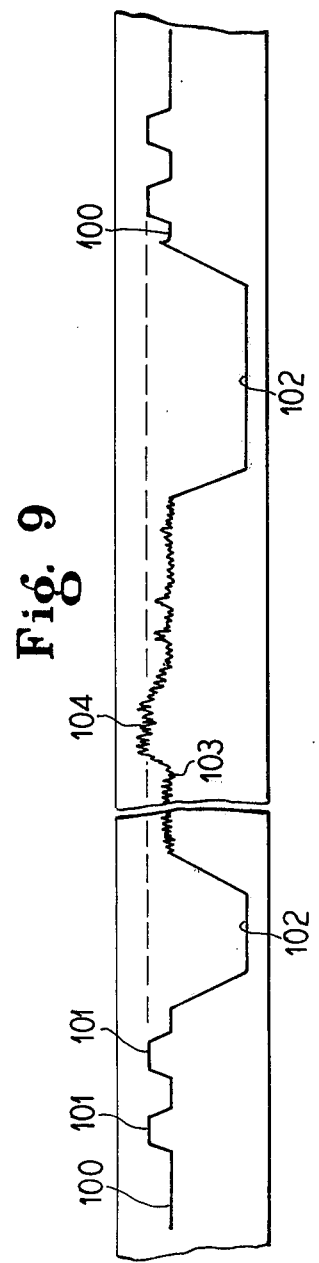
FIG. 9 is a view of a tracing from a pen recorder which is typical of tracings produced using the method of the present invention.

Once the length of pipe has bridged between the two electric eye assemblies 41 and 44, solenoid 76 is actuated and begins to move the calibration block 66 to its completely withdrawn position. For a while at least, the gamma ray beam will encounter both the two pipe wall thicknesses and the dimension A of the calibration block so that the amount of gamma rays detected falls to a low level indicated at 102 on the chart of FIG. 9. Finally, the calibration block 66 is withdrawn and the gamma ray beam passes only through the pipe wall thicknesses. The trace 103 of FIG. 9 initially indicates that the first part of the pipe had a thickness about equal to the nominal wall thickness. As the inspection proceeds, however, the trace 104 rises to a level equal to or exceeding the level indicated as the minimum wall thickness level 101. When this occurs, the operator marks the section of the pipe accordingly, indicating that it should be tested further by ultrasonics or the like. Finally, when the trailing edge of the pipe passes beyond the electric eye assembly 41, the solenoid 76 is actuated again, moving the calibration block 66 into the position shown in FIG. 4, so that the chart indicates a reading at the level 102 as shown in FIG. 9. Then, as the pipe passes the electric eye assembly 44, the dimension A of the calibration block 66 is in the path of the gamma ray beam and the indication returns to a level indicated at reference numeral 100.

While the foregoing description contemplates that the operator will manually push an operating button each time he wishes to calibrate the system it is also possible to operate the solenoid 91 in timed sequence so that the operator is given a periodic check of the minimum wall thickness value automatically.

It should be evident that various modifications can be made to the described embodiments without departing from the scope of the present invention.

We claim as our invention:

1. In a gamma ray inspection system for measuring the wall thickness of a tubular product passing therethrough, said system including a gamma ray beam generating station, means for conveying a tubular product axially past the gamma ray beam, means for rotating said beam generating station during the passage of the tubular product therethrough, and means for detecting the amount of attenuation of gamma rays in passing through said tubular product, the improvement which comprises a calibration block having a first portion thereof with a thickness corresponding to twice the nominal wall thickness of the tubular member to be inspected and a second portion having a thickness corresponding to a predetermined amount less than said nominal wall thickness, and means for selectively introducing said first and then said second portion into the gamma ray beam.

2. The system of claim 1 which includes first detecting means in advance of said gamma ray generating station and second detecting means behind said gamma ray generating station, said first and second detecting means being spaced a distance significantly less than the length of a tubular product to be inspected, and means actuated by signals from both said detecting means to withdraw said calibrating block from said gamma ray beam.

3. The system of claim 1 which includes means for axially moving said calibrating block into and out of the path of said gamma ray beam, and spring means normally urging said block into a gamma ray intercepting position.

4. The system of claim 3 in which said means for axially moving said calibrating block comprises a solenoid.

5. The system of claim 4 which includes a second solenoid means for positioning said calibrating block with its second portion intercepting the gamma ray beam.

6. A calibrating block for calibrating the operation of a gamma ray thickness measuring device comprising a metal block having a first portion having gamma ray attenuation characteristics corresponding to a predetermined dimension of the article to be tested and a second portion having gamma ray attenuation characteristics corresponding to said predetermined dimension less a predetermined amount of metal loss.

7. A calibrating block according to claim 6 which includes a pair of feet facilitating sliding of said block.

8. The method of operating a gamma ray tube thickness measuring device which comprises passing a beam of gamma rays radially through an axially moving tube being tested through an entire diameter of said tube, measuring the amount of gamma ray radiation passing through said tube, interposing a calibrating block into said beam when no tube is moving thereby, said calibrating block having one portion of a thickness of substantially twice the nominal wall thickness of the tube being tested and periodically presenting another portion of said calibrating block to the gamma ray beam, said other portion having a thickness a predetermined amount less than said nominal wall thickness.

9. The method of claim 8 which includes the steps of rotating the gamma ray beam during axial movement of said tube to thereby provide a helical scan along said tube.

* * * * *